3,570,101
HYDRAULIC AND PNEUMATIC SYSTEM FOR
CONTROLLING TOOLS
Albert Henry Stead, Northwood, England, assignor to
Skyhi Limited
Filed July 1, 1968, Ser. No. 741,518
Int. Cl. B23p 19/04
U.S. Cl. 29—208     6 Claims

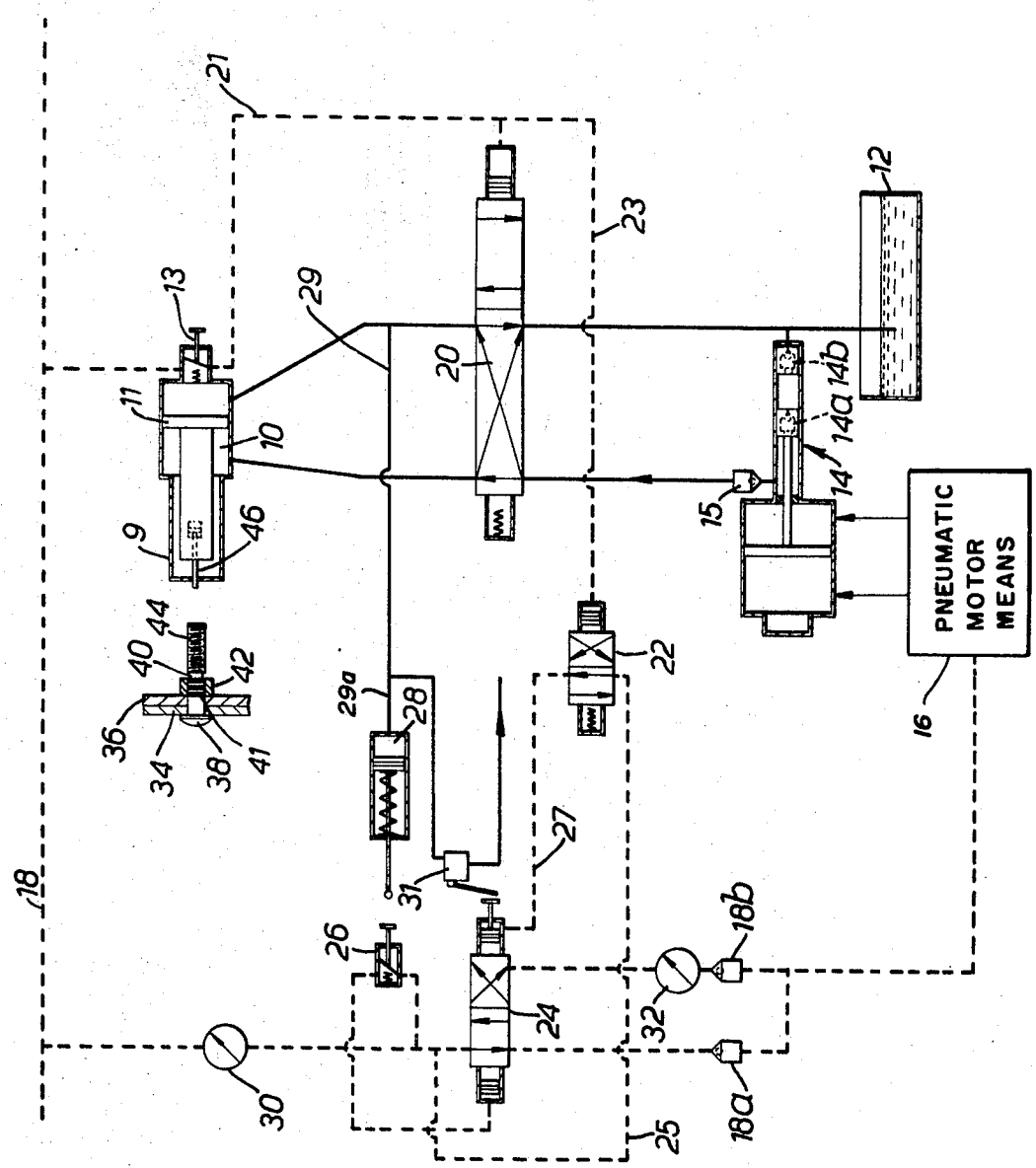

ABSTRACT OF THE DISCLOSURE

The disclosure relates to a method and apparatus for producing a plurality of predetermined output pressure levels from a hydraulic pump, for example for the purpose of anchoring a bolt under tension, and which consists in driving the pump by an air operated motor and positively varying the pressure of the air supply to the said air motor to produce the said predetermined hydraulic pressure levels from the pump which, in the embodiment described, operates a hydraulic bolt-anchoring tool in accordance with a plurality of steps in a bolt anchoring sequence.

---

This invention relates to a method of and apparatus for controlling the operation of a tool for use in anchoring bolts in position under a predetermined tensile load. Such preloaded bolts are used in heavily stressed structures, machines and equipment subject to impact loading.

The bolts themselves are well known. They are specially designed for the purpose in that instead of being provided with a screw thread for receiving a nut, the shank of each bolt is provided with a number of annular grooves into which metal from a collar is caused to flow whilst the bolt is under considerable tension and the collar is under reactive pressure. Above the grooves, that is in a direction away from the bolt head, there is provided a portion of reduced diameter or a "neck" which is calculated to rupture when the predetermined desired tension in the bolt is reached. The collar metal having entered the grooves, the bolt is then anchored under a tensile load exerted between the collar and the bolt head. Such a system is described in British specification No. 629,098.

The anchoring of such a bolt is carried out in a number of sequential stages, usually three in number. At each stage in the sequence a different force is require and these different forces are normally provided by a tool operating under different hydraulic pressures.

It is usual to control the hydraulic pressure, which in practice means oil pressure, direct but this involves the design of a wholly leak-proof system which at the pressures envisaged (up to 5000 p.s.i.) is bulky and expensive.

In the method in accordance with the invention for anchoring bolts as described above, pneumatic pressure is, used at different levels of pressure for producing the different hydraulic pressures required for the tool to carry out the bolt anchoring sequence. The variation in the pneumatic pressure levels is preferably directly under the control of the tool operator. Thus the amount of actual hydraulic equipment is reduced to the minimum and that part of the system where leaks must be prevented, is correspondingly smaller than if the whole system were to be hydraulically operative. Furthermore, it is easier to design an accurate pneumatic system than an hydraulic one and easier to control it.

The invention also includes an apparatus for carrying out the above method, said apparatus comprising an hydraulic pump for supplying fluid at a number of different operating pressures corresponding to the various stages in the bolt anchoring sequence, a pneumatically operated motor for driving the hydraulic pump and means for selectively varying the pressure of the supply to the pneumatically operated motor to produce the different operating pressures required from the pump.

Preferably the pneumatically operated motor and the hydraulic pump are constructed as a single hydropneumatic unit.

In order that the invention may be more easily understood and more readily carried into effect, an example of a bolt anchoring system in accordance therewith will now be described with reference to the accompanying drawing in which the hydraulic part of the system is shown in full lines and the pneumatic part in dotted lines.

Referring to the drawing the apparatus comprises a tool 10, supplied with hydraulic fluid, for example oil, from a source 12 by a pump 14 driven by pneumatic pressure produced by a compressed air motor 16 operated from a source of compressed air 18, the pump 14 and the motor 16 being combined to form a single unit. The apparatus comprises also an hydraulic control valve 20 and air control valves 22, 24, 26, the air control poppet valve 26 being under the control of pressure in the hydraulic part of the apparatus through a piston valve 28, fed by a pipeline 29a, and having an oil bleed valve 31 leading back to the source 12. The air control valves 22, 24, 26 are so arranged that they cause air from the air source 18 to be supplied to the air motor 16 at different pressures corresponding to the various stages of operation in the bolt anchoring sequence. At one stage of operation air is supplied to the motor 16 through a main pressure regulating valve 30 at about 100 p.s.i. whereas at another stage it is supplied to the motor 16 through the main regulating valve 30 and also through a regulating valve 32 in series therewith, at a reduced pressure of about 5 p.s.i., the change in the pressure in the air supply to the motor 16, being effected by the change-over of the valve 24.

As shown in the drawing the apparatus is applied to the bolting together of two metal plates 34, 36 by means of a preloaded bolt 38 and a collar 42. The shank of the bolt 38 has a portion of reduced diameter or neck 40 and is provided with a number of annular grooves 41 in the region of the collar 42. The bolt is passed through holes in the plate and the collar is swaged onto it so that metal from the collar 42 flows into the grooves 41, by the hydraulic tool 10 which stretches the bolt until it ruptures at the neck 40 leaving the pintail 44 in the tool 10. Before the tool is used to effect a further installation the pintail is ejected by mechanism associated with the tool itself, which has an injector device 46 for this purpose.

The hydro-pneumatic unit 14–16 is designed to provide a ratio of hydraulic pressure to pneumatic pressure of about 50:1 and at various stages in the sequence of operation it is necessary for oil at different specific pressures to be supplied to the tool 10. These pressures are:

(a) A low pressure of about 200 p.s.i. holding the tool gripping jaws open and permitting the end of the unbroken pintail to be inserted in the tool.

(b) A high maximum pressure of about 5000 p.s.i. for swaging on the collar and for stretching the bolt until the pintail ruptures.

(c) An intermediate high pressure up to about 2000 p.s.i. for ejecting the pintail.

Pressure (a) is produced on the right-hand side of the tool ram 11 through the hydraulic connections shown at the right-hand end of the valve 20 which is spring loaded into this position, air being supplied to the motor 16 at about 5 p.s.i. through the main regulating valve 30, the pneumatic connections at the right-hand end of the valve 24 and the second regulating valve 32. The piston in the motor 16 reciprocates under low pressure and delivers oil through a non-return valve 15 to the right-hand side of the ram 11.

Pressure (b) is produced on the left-hand side of the ram 11 through the hydraulic connection shown at the left-hand end of the valve 20 whilst it is held against its spring by air pressure supplied through a depressed push button 13. This air pressure also maintains the pilot valve 22 operated which in turn moves the valve 24 so that the pneumatic connections at its left-hand end become effective and air is supplied to the motor 16, passing only through the regulating valve 30.

Pressure (c) is produced on the right-hand side of the ram 11 by releasing the push button 13. This removes control air pressure from the valve 20 which is changed over by its spring and oil under pressure is supplied by the pump 14 through the hydraulic connections shown at the right-hand end of the valve 20, the pump 14 being driven by the air motor 16 which is supplied through the regulating valve 30 and the pneumatic connections shown at the left-hand end of the valve 24. When the ram 11 reaches the end of its stroke towards the left, pressure builds up in the pipe line 29 and at about 2,000 p.s.i. the pintail is ejected. Through the pressure in the pipeline 29a acting on the valve 28, the valve 24 is changed over to low pressure supply to the air motor, through the operation of the poppet valve 26. The valve 24 changing over, operates the oil bleed valve 31 to relieve the oil under pressure in the hydraulic part of the system which returns to source.

The complete operating sequence of the system is as follows:

The bolt 38 is passed through the two plates 34, 36 to be joined and the collar 42 is slipped onto the grooved shank of the bolt below the neck 40. The ram 11 is at the left-hand end of its cylinder, having just ejected the pin tail of the previous bolt, where it is held by oil at about 200 p.s.i. delivered by the oil pump 14 through the right-hand connections of the change over valve 20. At this stage the oil pump is driven by the air motor 16 which is supplied with air from the source 18 through the main air pressure regulating valve 30, the right-hand connections of the valve 24 and the second regulating valve 22, at a pressure of about 5 p.s.i. The pintail 44 of the bolt 38 is forced into the open jaws of the tool 10, pushing the ejector 46 into the tool against the low hydraulic pressure of 200 p.s.i. At the same time an outer sleeve 9 engages the collar 42 on the bolt shank.

The push button 13 is now depressed and control air is applied through a pipe 21 to the hydraulic change over valve 20 so as to change it over into the position shown in the drawing. At the same time control air is supplied through a pipe 23 to the air pilot valve 22 which change over against the action of its spring into the position shown in the drawing and in so doing supplies control air from the main source 18 through a pipe 25, to the change over air valve 24 through a pipe 27. The valve 24 changes over, and operating air now passes through the left-hand connections of the valve 24 to the motor 16 at an increasing pressure which can rise to about 100 p.s.i., by-passing the low pressure regulating valve 32.

The ram 11 is now moved to the right under maximum hydraulic pressure and the tool jaws automatically close to grip the bolt. As the bolt 38 begins to stretch, and the collar 42 becomes swaged onto its shank, the hydraulic pressure builds up to about 5000 p.s.i. when the pintail 44 snaps off at the neck 40. The metal plates 34, 36 are now held between the head of the bolt and the collar 42, the bolt being under a predetermined tensile load.

The push button 13 is now released so that valves 20 and 22 change over. The right-hand connections of the valve 22 now being in circuit, this valve exhausts the air to atmosphere. However, valve 24, not being spring loaded, remains in its position as shown in the drawing. Air at high pressure is still supplied to the motor 16 and the pump now operating at the right-hand connections of the valve 20 moves the ram 11 to the left. When the ram 11 reaches the end of its stroke, oil pressure builds up to the right of the ram until at about 2000 p.s.i. the oil operates a mechanism in the tool 10 which ejects the broken-off pintail 44.

At this oil pressure of 2000 p.s.i., the hydraulic piston valve 28 operates and in its turn it operates the air poppet valve 26 which applies main air to the valve 24 to change it over. The air motor is now supplied with air through the connections shown at the right-hand end of the valve 24 and through both pressure regulating valves 30 and 32, thus reducing it to about 5 p.s.i. As the valve 24 changes-over, it operates the oil bleed valve 31 which opens to allow surplus oil to the right of the ram 11, to pass back to the source 12. This low air pressure will maintain an oil pressure of about 200 p.s.i. to the right of the ram 11 and having reached that pressure the air motor will stall due to overload conditions. The tool 10 is now ready to receive another pintail 44 and the sequence can be repeated.

Non-return oil valves 14a and 14b are provided for proper operation of the pump 14 and non-return air valves 18a and 18b are provided for the proper operation of the air motor.

It will be understood that the invention is not limited to a hydraulic/pneumatic pressure ratio of about 50:1 as above stated, for example the ratio could be 100:1 or even higher.

I claim:
1. Apparatus for sequentially operating a bolt anchoring tool to anchor a bolt in position under a predetermined tensile load, said tool including work gripping jaws, comprising a hydraulic ram (11) arranged for reciprocation within a cylinder;
first means for initially operating said ram in one direction under low hydraulic pressure to open said work gripping jaws for receiving the unbroken pintail of a bolt, said first means including a hydraulic pump (14), pneumatic motor means (16) mechanically connected with said pump, a source of air under pressure (18), main (30) and reduced (32) pressure regulating means, and conduit means connecting said pneumatic motor means with said source via said main and said reduced pressure regulating means, whereby air is supplied at a reduced pressure to said pneumatic motor to drive said pump to produce said low hydraulic pressure;
second means for operating said ram in the opposite direction under high hydraulic pressure to stretch the bolt until the pintail ruptures, said second means including hydraulic changeover valve means (20) connected between said pump and said ram means and operable from a normal position to a reversing position for reversing the hydraulic connections between said pump and said ram means, pneumatic change-over valve means (24) connected across said reduced pressure regulating means and operable from a normal position to a by-passing position for by-passing said reduced pressure regulating means and for connecting said pneumatic motor means directly with said source via said main pressure regulating means, and means (13) for operating said hydraulic change-over valve means to said reversing position and said pneumatic change-over valve means to said by-passing position, whereby air is supplied at a higher pressure to said pneumatic motor to drive said pump to apply said high hydraulic pressure in the opposite direction to said ram means; and
third means for finally operating said ram in the first direction at an intermediate hydraulic pressure to eject the severed pintail.

2. Apparatus as defined in claim 1, wherein said means for operating said hydraulic change-over valve means toward the reversing position and for operating said pneumatic change-over valve means toward the by-passing position includes normally-disabled pneumatic circuit means (21, 27), and push button valve means (13) operable from a disabled condition to an enabled condition for enabling said pneumatic circuit means.

3. Apparatus as defined in claim 2, wherein said hydraulic change-over valve means (20) is spring-biased toward said normal position.

4. Apparatus as defined in claim 3, wherein said means for operating said pneumatic by-passing valve to said by-passing position comprises pneumatic conduit means (25, 27) containing a normally-closed pilot valve (22) for connecting one end of said pneumatic by-passing valve means with said source of pressure air, and means (23) for opening said pilot valve simultaneously with the operation of said hydraulic change-over valve means to said reversing position.

5. Apparatus as defined in claim 4, wherein said push button valve means (13) is spring-biased toward said disabled condition, whereby upon release of said push-button valve means, said spring-biased hydraulic change-over valve means is returned to its normal position, and further including pneumatic conduit means containing a normally-closed poppet valve (26) for operating said pneumatic change-over valve means to its by-pass position, and pressure-responsive valve means (28) operable when an intermediate pressure is reached during movement of the ram in the first direction for opening said poppet valve to operate said pneumatic change-over valve means to said by-pass position.

6. Apparatus as defined in claim 5, and further including hydraulic bleed valve means (31) operable by said pneumatic change-over valve means to relieve the hydraulic fluid under pressure when said pneumatic change-over valve means is completely changed over by said poppet valve means.

References Cited
UNITED STATES PATENTS

| | | | |
|---|---|---|---|
| 1,413,014 | 4/1922 | Eisinga | 29—252X |
| 2,140,658 | 12/1938 | Van Sittert | 74—110 |
| 2,365,147 | 12/1944 | Speller | 29—208 |
| 2,456,125 | 12/1948 | Johndrew | 29—208 |

JOHN F. CAMPBELL, Primary Examiner

V. A. DI PALMA, Assistant Examiner

U.S. Cl. X.R.
29—243.53, 252